United States Patent
Garimella et al.

(10) Patent No.: US 8,354,146 B2
(45) Date of Patent: Jan. 15, 2013

(54) METHODS FOR REPAIRING GAS TURBINE ENGINE COMPONENTS

(75) Inventors: Balaji Rao Garimella, Singapore (SG); Sor Tin Ng, Singapore (SG); Yap Wai Ping, Singapore (SG)

(73) Assignee: Turbine Overhaul Services PTE Ltd, Jurong Town (SG)

( * ) Notice: Subject to any disclaimer, the term of this patent is extended or adjusted under 35 U.S.C. 154(b) by 426 days.

(21) Appl. No.: 12/468,254

(22) Filed: May 19, 2009

(65) Prior Publication Data

US 2010/0112239 A1 May 6, 2010

(30) Foreign Application Priority Data

Nov. 6, 2008 (SG) .................. 200808264-6

(51) Int. Cl.
*B06B 1/20* (2006.01)
*C23C 16/00* (2006.01)

(52) U.S. Cl. ............... 427/600; 427/248.1; 427/255.11; 427/255.4

(58) Field of Classification Search ............. 427/600, 427/248.1, 255.11, 255.4
See application file for complete search history.

(56) References Cited

U.S. PATENT DOCUMENTS

| | | | |
|---|---|---|---|
| 4,098,450 A | 7/1978 | Keller et al. | |
| 5,902,647 A * | 5/1999 | Venkataramani et al. | 427/454 |
| 7,883,743 B2 * | 2/2011 | Ng et al. | 427/248.1 |
| 2005/0067466 A1 * | 3/2005 | Boegli et al. | 228/119 |
| 2007/0087208 A1 * | 4/2007 | Ng et al. | 428/457 |

FOREIGN PATENT DOCUMENTS

| | | |
|---|---|---|
| EP | 525545 | 2/1993 |
| EP | 1316628 | 6/2003 |
| EP | 1676938 | 7/2006 |
| EP | 1983075 | 10/2008 |
| JP | 6256998 | 9/1994 |
| JP | 2001214708 | 10/2001 |
| WO | 2008106935 | 9/2008 |
| WO | 2008128848 | 10/2008 |

OTHER PUBLICATIONS

R.M. Fuller, Nickel, Including High-Nickel Alloys, Industrial and Engineering Chemistry, 48(9) Part II, Sep. 1956, pp. 1742-1759.*
EP Search Report dated Nov. 9, 2010.
Australian Patent Office Examination Report for SG200808264-6.
Australian Patent Office Search Report dated Jul. 15, 2009.

* cited by examiner

*Primary Examiner* — Kelly M Gambetta
(74) *Attorney, Agent, or Firm* — Carlson, Gaskey & Olds, PC

(57) ABSTRACT

Methods for repairing gas turbine engine components are provided. In this regard, a representative method includes: applying a surface treatment to the component such that locations at an exterior surface of the component exhibiting intergranular attack are protected from erosion during a cleaning process; and cleaning the component using hydrogen fluoride ion cleaning to clean the component.

3 Claims, 5 Drawing Sheets

METHODS FOR REPAIRING GAS TURBINE ENGINE COMPONENTS

RELATED APPLICATION

This application claims priority to Singapore Patent Application Number 200808264-6, which was filed Nov. 6, 2008.

BACKGROUND

1. Technical Field

The disclosure generally relates to repair of gas turbine engine components.

2. Description of the Related Art

Gas turbine engine components typically experience harsh operating conditions such as high temperature cycling, which can result in thermal fatigue. Additionally, some engines are exposed to harsh environment conditions such as salt ingestion that can occur during transoceanic flights, for example. Due to these and other factors, gas turbine engine components can wear and/or become damaged. In this regard, repair of gas turbine engine components oftentimes involves dimensionally restoring the components. Unfortunately, repair of these components oftentimes is impractical because various processes required for such repairs (e.g., relatively aggressive cleaning) can damage the components even further.

SUMMARY

Methods for repairing gas turbine engine components are provided. In this regard, an exemplary embodiment of a method includes: applying a surface treatment to the component such that locations at an exterior surface of the component exhibiting inter-granular attack are protected from erosion during a cleaning process; and cleaning the component using hydrogen fluoride ion cleaning to clean the component.

Another exemplary embodiment of a method includes: providing a gas turbine engine component having a thermal coating, the component having a defect exhibiting oxidation; removing the thermal coating from the component; applying a sacrificial coating to the component; cleaning the component such that at least some of the sacrificial coating and at least some of the oxidation are removed; and repairing the defect.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Methods for repairing gas turbine engine components are provided, several exemplary embodiments of which will be described in detail. In some embodiments, a gas turbine engine component is repaired for return to service by filling cracks that open to the surface of the component. Prior to filling the defect or cracks, the component is cleaned with a relatively aggressive cleaning process, such as hydrogen fluoride ion cleaning. In order to alleviate the potential surface damage caused by the cleaning process, one or more sacrificial coatings can be applied to the surface of the component so that the cleaning removes the sacrificial coating. In some embodiments, the sacrificial coating is plated onto the surface of the component with the assistance of ultrasonic vibrations to enhance uniformity of the plated sacrificial coating.

Figure 1:
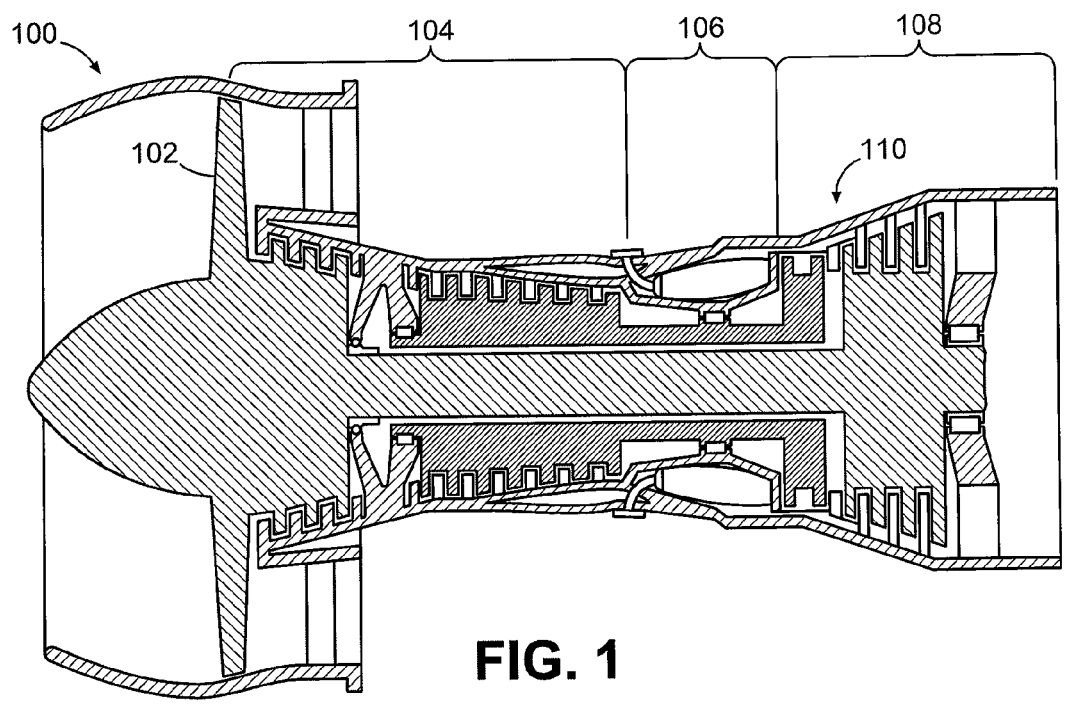
FIG. 1 is a schematic diagram depicting an exemplary embodiment of a gas turbine engine.

In this regard, reference is made to the schematic diagram of FIG. 1, which depicts an exemplary embodiment of a gas turbine engine. As shown in FIG. 1, engine 100 is depicted as a turbofan that incorporates a fan 102, a compressor section 104, a combustion section 106 and a turbine section 108. Notably, turbine section 108 includes a vane assembly 110, the repair of which will be described in detail below. Although depicted as a turbofan gas turbine engine, it should be understood that the concepts described herein are not limited to use with components of turbofans, as the teachings may also be applied to components of other types of gas turbine engines or to other surfaces experiencing similar types of stress and harsh conditions.

Figure 2:
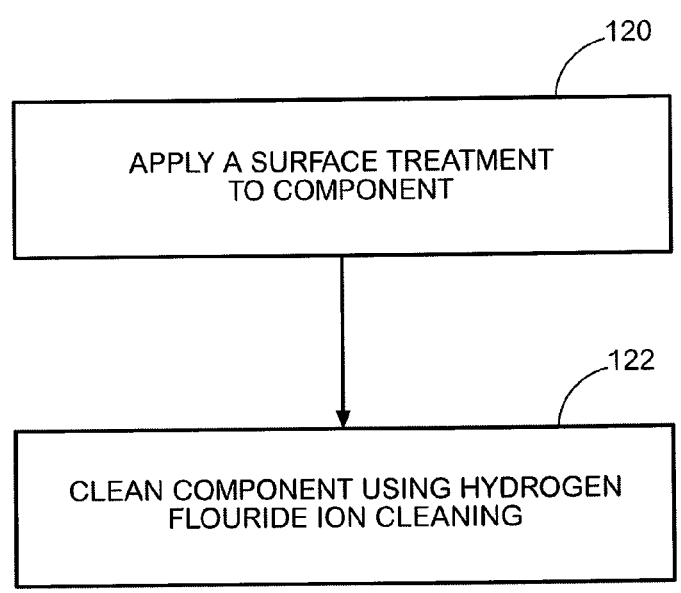
FIG. 2 is a flowchart depicting an exemplary embodiment of a method for repairing a gas turbine engine component.

FIG. 2 is a flowchart depicting an exemplary embodiment of a method for repairing a gas turbine engine component, such as vane assembly 110 of FIG. 1. As shown in FIG. 2, the method may be construed as beginning at block 120, in which a surface treatment such as a sacrificial layer is applied to the component. In some embodiments, the surface treatment is applied at least to locations at an exterior surface of the component exhibiting inter-granular attack. Notably, inter-granular attack can occur in components (particularly nickel components) due to the high temperature environments in which those components operate. Specifically, the inter-granular attack is manifest as oxidation at the grain boundaries. Application of the surface treatment is performed so that the exterior surface of the component is protected from erosion during a subsequent cleaning process. In some embodiments, the surface treatment can be diffused, such as by exposing the surface treated component to elevated temperatures for a prolonged period of time. For instance, a surface treatment can be diffused at between approximately 1800° F. and approximately 2000° F. approximately (e.g., approximately 1079.4° C. (1975° F.)). Thereafter, such as depicted in block 122, hydrogen fluoride ion cleaning is used to clean the component. In other words, the surface treatment facilitates reducing the potential for the cleaning to damage the exterior surface.

Figure 3:
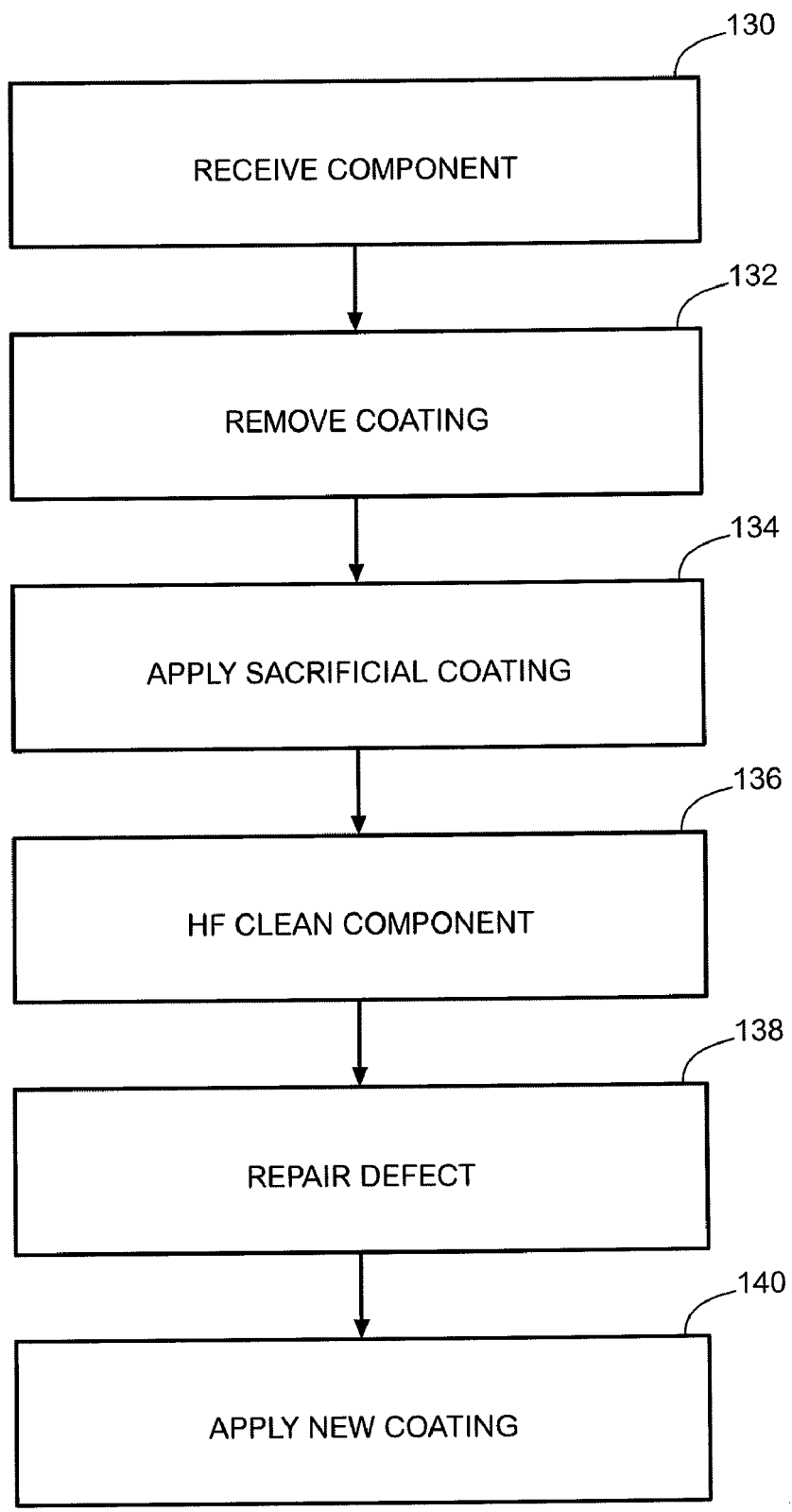
FIG. 3 is a flowchart depicting another exemplary embodiment of a method for repairing a gas turbine engine component.
Figure 4A:
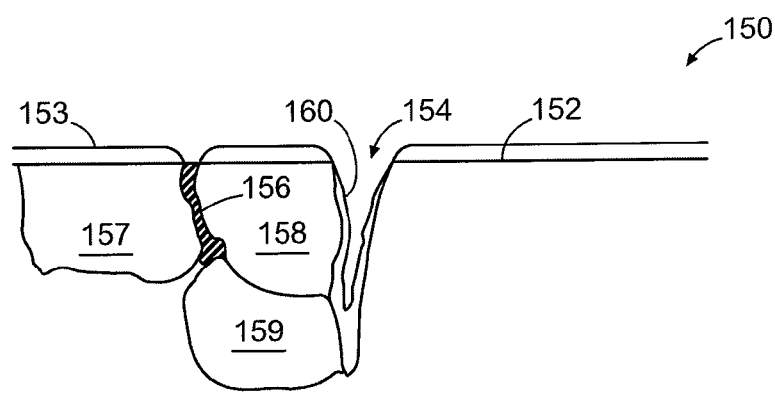
FIGS. 4A-4F are schematic diagrams showing a portion of a representative gas turbine engine component during repair by the method of FIG. 3.

FIG. 3 is a flowchart depicting another exemplary embodiment of a method for repairing a gas turbine engine component, with FIGS. 4A-4F being schematic diagrams showing a portion of a representative component during that method. As shown in FIG. 3, the method may be construed as beginning at block 130, in which a gas turbine engine component with a thermal coating is received. In some embodiments, the component can be a component of a turbine section (e.g., a vane assembly) and the coating can be formed of ceramic and/or metal, for example. Additionally, the component includes a defect exhibiting oxidation. An exemplary embodiment of such a component is depicted in FIG. 4A, in which component 150 includes an exterior surface 152 (which has a thermal coating 153) and a defect 154 (e.g., a crack) extending through the surface 152. The component 150 also exhibits inter-granular attack 156 (i.e., oxidation) between representative grains 157, 158 and 159. A layer of oxidation 160 also is present in defect 154.

Figure 4B:
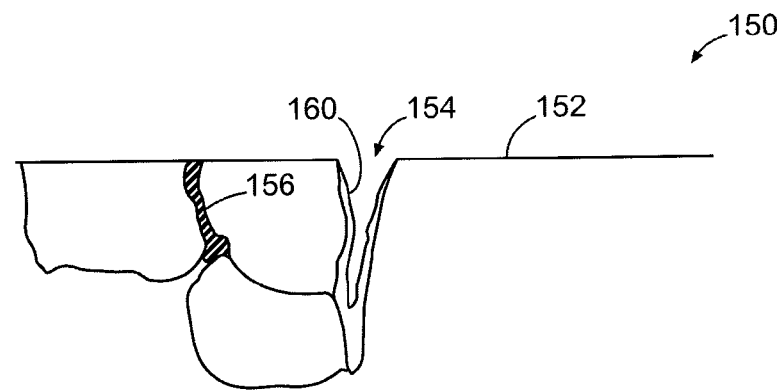

In block 132 (FIG. 3), the thermal coating is removed from the component. By way of example, the thermal coating can be removed by blasting (e.g., using aluminum oxide) and/or chemical stripping, for example. The component 150 with the thermal coating 153 removed is depicted in FIG. 4B.

Figure 4C:
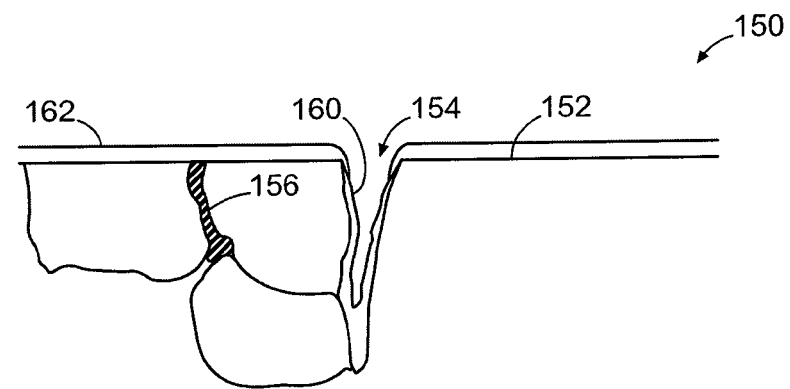

In block 134, a sacrificial coating 162 is applied to the component 150, such as shown in FIG. 4C. In some embodiments, the sacrificial coating can be a nickel coating. Coating with nickel can be used to compensate for a loss of nickel that may occur in a component due to inter-granular attack.

Such a sacrificial coating can be applied, for example, via a plating process. In order to enhance uniformity of application of the sacrificial coating during plating, ultrasonic energy can be used. Use of ultrasound to enhance a plating process will be described later. In the embodiment of FIG. 4C, sacrificial coating 162 is applied to a thickness of between approximately 0.0127 mm (0.0005 inches) and approximately 0.254 mm (0.010 inches), preferably between approximately 0.0254 mm (0.001 inches) and approximately 0.127 mm (0.005 inches).

Figure 5:
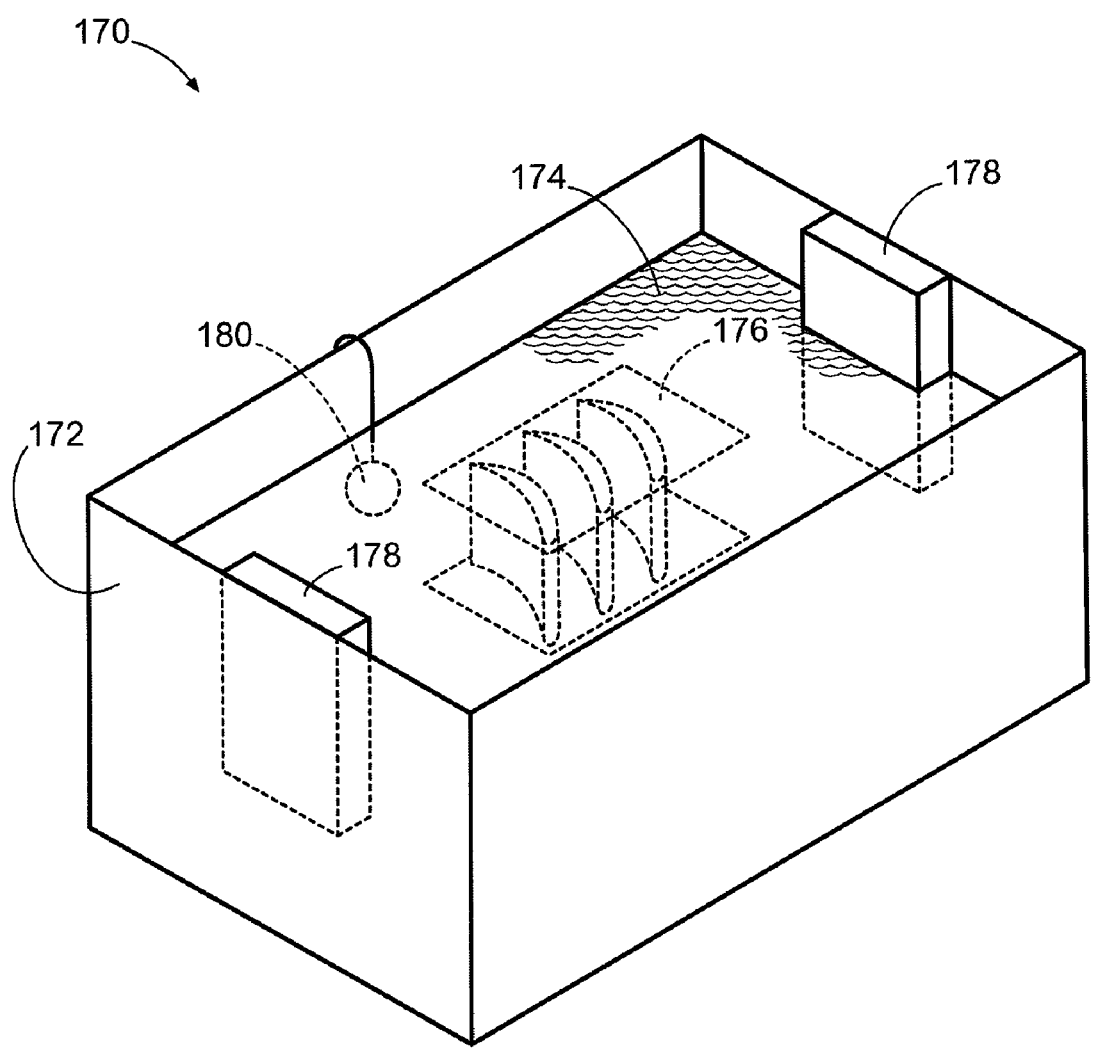
FIG. 5 is a schematic diagram depicting an exemplary embodiment of a plating system that can be used for plating a component.

FIG. 5 is a schematic diagram depicting an exemplary embodiment of a plating system that can be used for plating a component with a sacrificial coating. As shown in FIG. 5, system 170 includes a plating tank 172 that contains a plating solution 174, which includes a liquid salt (in this case, a liquid salt of nickel). A component 176 is immersed in the plating solution. The component 176, which is a multi-airfoil vane assembly in this embodiment, functions as the cathode. An anode 178 also is present.

System 170 also includes an ultrasonic transducer 180 that propagates sound energy into the plating solution. The ultrasonic transducer 180 produces ultrasonic vibrations in the plating solution in a frequency range of between approximately 15 KHz and approximately 25 KHz, preferably approximately 20 Khz.

In operation, the ultrasonic vibrations imparted to the plating solution 174 by the transducer 180 enhance the uniformity of material plating onto the exterior surface of the component 176. The plating uniformity tends to reduce the ability of hydrogen fluoride gas from attacking the grain boundaries during cleaning, thereby reducing inter-granular attack.

Figure 4D:
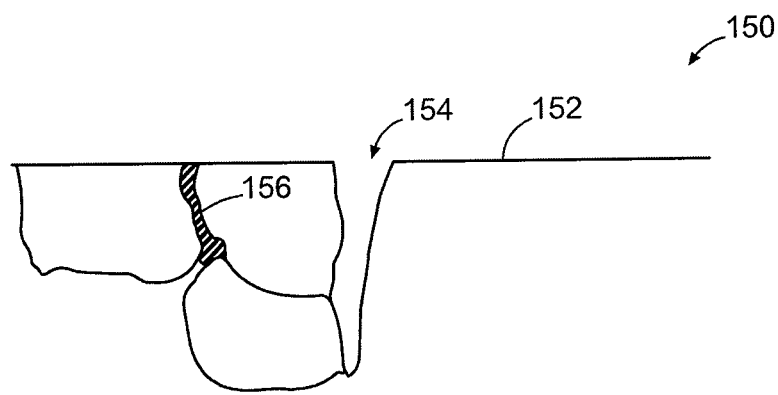

In block 136 (FIG. 3), the component is cleaned so that at least some of the sacrificial coating and at least some of the oxidation are removed. In some embodiments, hydrogen fluoride ion cleaning is used. As shown in FIG. 4D, all of the sacrificial coating 162 and the oxidation 160 that were present at the defect 154 are removed. Notably, the location of inter-granular attack 156 does not exhibit a depression in the exterior surface 152 of the component 150 that could otherwise occur if the sacrificial coating 162 were not used to protect that location during cleaning.

Such cleaning can include exposing components to repeated cycles of hydrogen fluoride gas and hydrogen gas, as well as vacuum atmosphere at various temperatures. At cycle temperatures of approximately 1079.4° C. (1975° F.), oxides react with hydrogen fluoride gas, resulting in removal of the oxides from the components. Residuals from this hydrogen fluoride reaction can be removed by processing with the hydrogen gas and vacuum atmosphere.

Figure 4E:
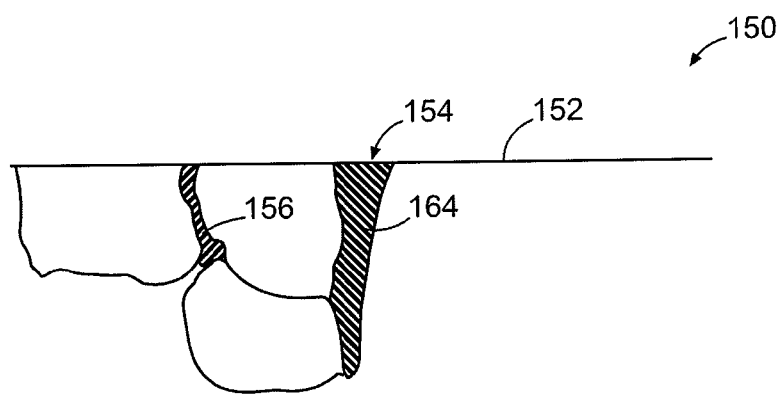

Then, as depicted in block 138 (FIG. 3), the defect is repaired. In this case, the crack is filled with material to restore the dimensional characteristics of the component. For instance, brazing material 164 can be used to fill the crack such as shown in FIG. 4E. Depending upon the material and/or technique used, various related treatments can be used, such as diffusion brazing and/or heat treating the component to relieve material stresses, for example.

Figure 4F:
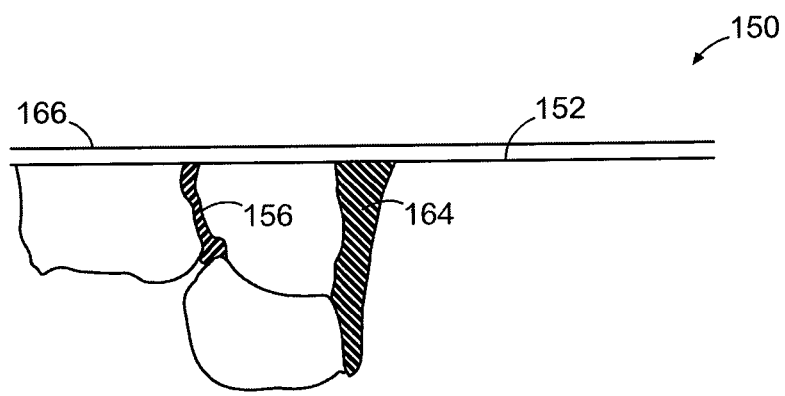

In block 140 (FIG. 3), a replacement thermal coating is applied to the exterior of the component. As shown in FIG. 4F, replacement thermal coating 166 adheres to the exterior of the component including locations in which brazing material is present.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

What is claimed is:

1. A method for repairing a component comprising:
   providing a gas turbine engine component having a thermal coating, the gas turbine engine component having a defect exhibiting oxidation;
   removing the thermal coating from the gas turbine engine component;
   applying a sacrificial coating to the gas turbine engine component on the defect exhibiting oxidation and on an area evidencing inter-granular attack prior to cleaning;
   cleaning the gas turbine engine component such that at least some of the sacrificial coating and at least some of the oxidation are removed; and
   repairing the defect and said area evidencing inter-granular attack;
   wherein applying a sacrificial coating comprises plating said sacrificial coating;
   wherein, during plating of the gas turbine engine component, ultrasonic vibrations from an ultrasonic transducer are used to enhance uniformity of the plating about the gas turbine engine component.

2. The method of claim 1, wherein the ultrasonic vibrations are provided in a frequency range of between approximately 15 KHz and approximately 25 KHz.

3. The method of claim 1, wherein the ultrasonic vibrations are provided at a frequency of approximately 20 KHz.

* * * * *